United States Patent

Amos et al.

3,837,731
Sept. 24, 1974

[54] OIL DISPENSER FOR MICROSCOPE OBJECTIVE

[75] Inventors: Lynn G. Amos, Raleigh; Charles A. Howard, Apex, both of N.C.

[73] Assignee: Corning Glass Works, Corning, N.Y.

[22] Filed: June 22, 1973

[21] Appl. No.: 372,676

[52] U.S. Cl. ............................ 350/179, 350/175 ML
[51] Int. Cl. ......................... G02b 3/12, G02b 21/02
[58] Field of Search .... 350/179, 180, 204, 175 ML, 350/63, 90, 95

[56] References Cited
UNITED STATES PATENTS

| | | | |
|---|---|---|---|
| 3,202,049 | 8/1965 | Bond | 350/179 X |
| 3,648,587 | 3/1972 | Stevens | 350/179 UX |

*Primary Examiner*—John K. Corbin
*Attorney, Agent, or Firm*—Walter S. Zebrowski; Clarence R. Patty, Jr.

[57] ABSTRACT

A device for dispensing oil between the leading portion of a microscope objective and a microscope slide. The oil dispenser of the present invention includes an enclosure which is attached to the microscope objective such that the leading edge of the objective protrudes through a central aperture in the face plate of the enclosure. Oil is automatically fed from a suitable source to the enclosure through a check valve. The oil is caused to flow from the enclosure to the space between the microscope objective and a microscope slide so as to effect a full oil contact therebetween.

9 Claims, 3 Drawing Figures

PATENTED SEP 24 1974  3,837,731

OIL DISPENSER FOR MICROSCOPE OBJECTIVE

BACKGROUND OF THE INVENTION

1. Field of the Invention:

This invention relates to an automatic oiling device for dispensing a quantity of oil between a microscope objective and a microscope slide to improve the amount of light passing therethrough and enhance image quality. More specifically, the present oil dispenser automatically maintains a continuous full oil contact between a microscope objective and a slide even under high speed automatic scanning.

2. Background of the Invention:

Heretofore, it has been the practice to apply or smear optical index oil on a microscope slide with a manual applicator and then drive the microscope objective down into the oil and back up to focus. The layer of oil applied to the slide would then permit oil contact between the objective and the slide during relatively slow manual scanning. If full oil contact was broken, the viewer would manually add oil to reestablish full oil contact and then continue his scanning. However, with the advent of automated scanning machines, such techniques have been found to be undesirable because full oil contact could easily be broken and high speed scanning would be continued without oil contact resulting in little useful scanning having taken place. It has been found that reliable and automatic oil dispensing is imperative for modern high speed scanning and is highly desirable even for manual scanning.

SUMMARY OF THE INVENTION

Therefore, it is the object of this invention to provide an oil dispenser which maintains full oil contact between the microscope objective and a microscope slide at both high speed automatic and slow manual scanning which overcomes the aforementioned disadvantages.

Briefly, the present invention comprises a housing adapted to attach to a microscope objective, which housing has a face plate associated therewith to form an enclosure. The face plate has a central aperture to accommodate the leading portion of the microscope objective whereby the objective protrudes through the aperture. Means for supplying oil to the housing are provided as well as means for flowing a quantity of oil from the housing to the space between the leading portion of the microscope objective and the microscope slide. Sufficient oil is provided to this space to maintain full oil contact between the objective and the slide.

Additional objects, features and advantages of the present invention will become apparent to those skilled in the art from the following detailed description and the attached drawing on which, by way of example, only the preferred embodiment of this invention is illustrated.

DETAILED DESCRIPTION OF THE INVENTION

It is to be noted that the figures of the drawings are illustrative and symbolic of the present invention, and there is no intention to indicate scale or relative proportions of the elements shown therein. For the purpose of simplicity, the present invention will be described in connection with using the present oil dispenser with blood slides for medical examination, however, the present invention is in no way limited to such application.

Figure 1:
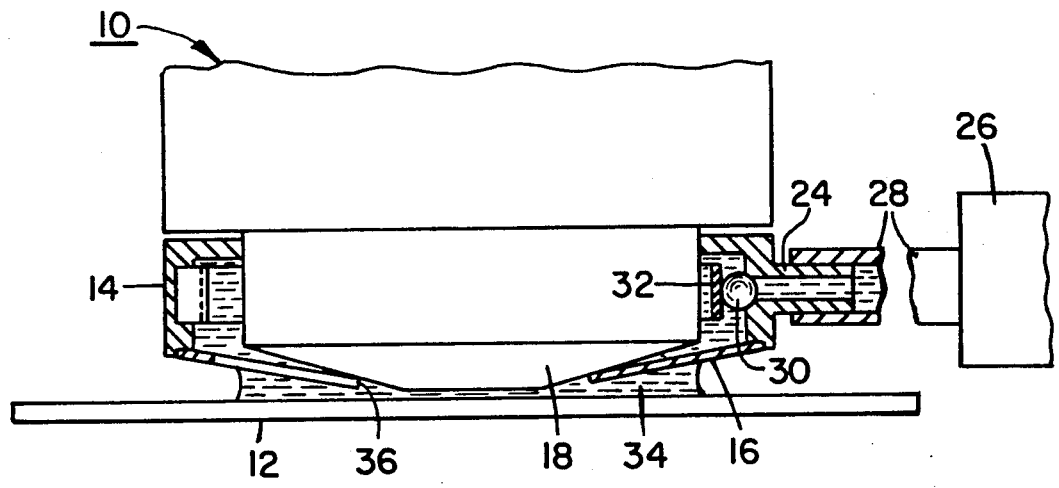
FIG. 1 is a fragmentary elevation partly in section illustrating the device of the present invention.
Figure 2:
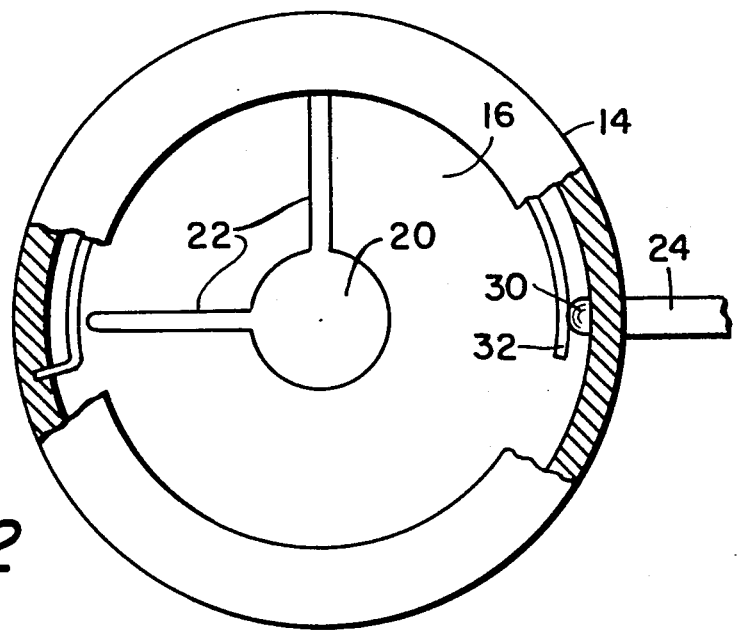
FIG. 2 is a plan view of the oil dispenser of the present invention.
Figure 3:
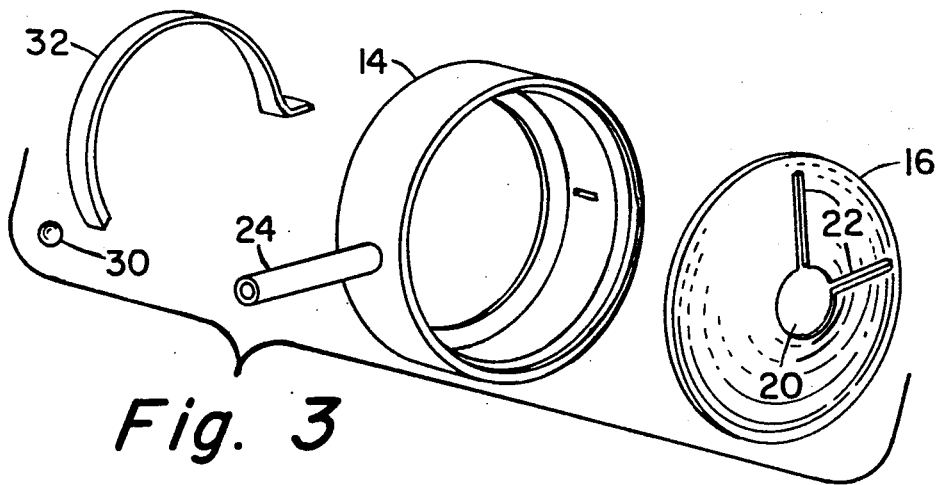
FIG. 3 is an exploded oblique view of one embodiment of the oil dispenser of the present invention.

Referring to FIG. 1, an oil dispenser is shown affixed to a microscope objective 10 in close proximity to a blood slide 12 as it would be when the apparatus is in focus. Referring additionally to FIGS. 2 and 3, the oil dispenser of the present invention is shown having housing 14 which is adapted for attachment to objective 10. A face plate 16 is affixed to housing 14 so as to permit the leading portion 18 of the microscope objective to protrude through aperture 20 formed within face plate 16. Face plate 16 may have one or more means formed therein, such as slots 22, to facilitate the flow of oil from the housing to the space between the microscope objective 10 and a slide 12. Such means may also be a plurality of holes within face plate 16. Slots 22 are shown to be radial slots spaced about 90° apart and are the preferred means. Although face plate 16 may be a flat surface, the preferred embodiment is shown in the drawing with the face plate being conically shaped and aperture 20 being located at the cone apex.

Oil inlet port 24 permits optical index oil, from a suitable source 26, to be provided to housing 14 under pressure. Oil source 26 is connected to the oil inlet port 24 by any suitable means known in the art, such for example as hose 28.

Within housing 14, a means is provided to control the flow of oil into the housing. Such a means may be a check valve consisting of a fitted ball 30 and a spring 32, which spring is disposed to seat and maintain ball 30 in a closed position except when oil is being supplied to housing 14.

The operation of the present oil dispenser is as follows. Oil is pumped from source 26 through inlet port 24 into housing 14 until it is substantially full of oil. The surface tension of the oil is sufficient to resist passage through the narrow slots in face plate 16; that is, a positive pressure must exist in housing 14 to initially dispense oil. This prevents the leakage of oil when the device is not being used. The oil leaves housing 14 by means of slots 22 and is caused to flow toward the leading portion 18 of objective 10 by means of the surface tension facilitated by the conical tapered construction of face plate 16. When sufficient oil has been dispensed from housing 14, a puddle 34 of oil is formed between leading portion 18 of objective 10 and blood slide 12. The geometry of face plate 16 aids in creating hydrodynamic forces that maintain full oil contact between leading portion 18 and blood slide 12. In particular annular step 36, created by the thickness of face plate 16 adjacent leading portion 18 of the objective, is effective in maintaining full oil contact at high scanning speeds. Step 36 tends to push the oil in the direction of travel of objective 10. As the objective is caused to scan the blood slide, the oil in puddle 34 may be replenished by the oil within housing 14 as required to maintain full oil contact between these surfaces. Pressure at source 26 is required to replenish the oil in the housing. Oil may be continuously replenished in housing 14 from source 26 or may be replenished whenever speed and length of the scan depletes puddle 34 sufficiently so as to endanger the full oil contact condition.

As a typical example, a suitable face plate may be one having 2 radial slots formed therein spaced about 90° apart, the slots having a width of from about 0.010 to about 0.040 inch and a length of about 1/4 inch. A suitable slope for the face plate is about 12° with the horizontal.

Although the present invention has been described with respect to specific details of certain embodiments thereof, it is not intended that such details be limitations upon the present invention except insofar as is set forth in the following claims.

We claim:

1. A device for dispensing of oil between the leading portion of a microscope objective and a microscope slide comprising
    a housing adapted to attach to said microscope objective,
    a face plate operatively associated with said housing to form an enclosure, said face plate having a central aperture to accommodate said leading portion of said microscope objective,
    means for supplying oil to said housing, and
    means including at least one elongated radial slot formed in said face plate terminating at said aperture for flowing a quantity of oil from said housing to the space between said leading portion of said microscope objective and said microscope slide sufficient to maintain full oil contact between said objective and said slide.

2. The device of claim 1 wherein said means for flowing includes two elongated radial slots formed in said face plate spaced about 90° apart and terminating at said aperture.

3. The device of claim 1 wherein said means for supplying includes a check valve.

4. The device of claim 1 wherein said face plate is conically shaped and said aperture is located at the cone apex, said leading portion of said microscope objective protruding through said aperture.

5. The device of claim 1 wherein said means for supplying includes a source of oil under pressure.

6. The device of claim 5 wherein said means for supplying further includes a check valve.

7. The device of claim 6 wherein said check valve comprises a ball and a spring associated with said ball for controlling the flow of oil into said housing, said ball and spring being disposed within said housing.

8. The device of claim 7 wherein said face plate is conically shaped and said aperture is located at the cone apex, said leading portion of said microscope objective protruding through said aperture.

9. The device of claim 8 wherein said means for flowing includes two elongated radial slots formed in said face plate spaced 90° apart and terminating at said aperture.

* * * * *